United States Patent Office 2,842,109
Patented July 8, 1958

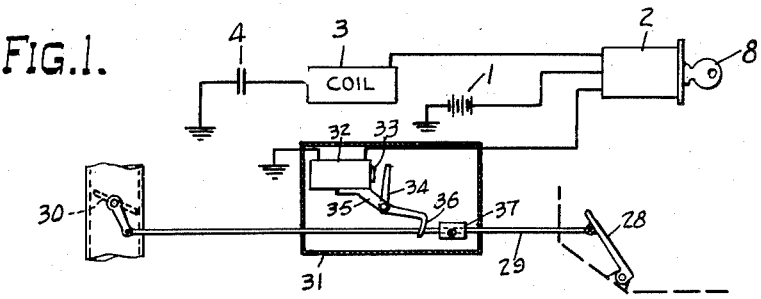
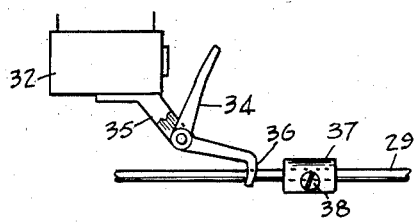
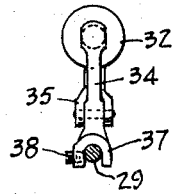
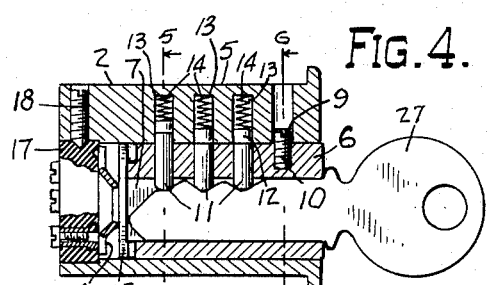
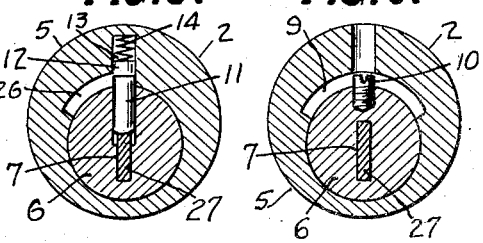
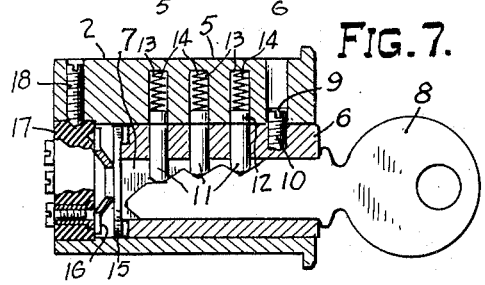
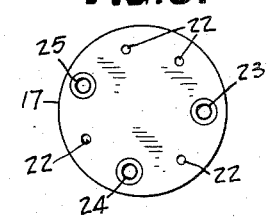
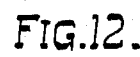
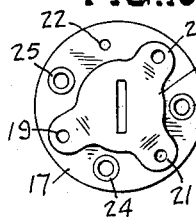
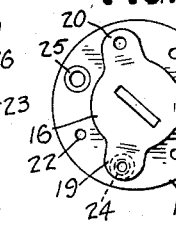
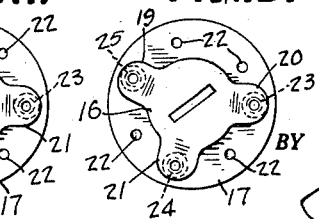
INVENTOR.
Patrick T. Baldwin
ATTORNEY

2,842,109

IGNITION ACTUATED SPEED GOVERNING APPARATUS

Patrick T. Baldwin, Milwaukee, Wis.

Application March 9, 1956, Serial No. 570,610

8 Claims. (Cl. 123—102)

This invention relates to an apparatus for governing the speed of a prime mover and more particularly to an apparatus for selectively governing the speed of a vehicle.

In the past, numerous devices have been employed to govern the speed of a vehicle. For a truck, a governing device is usually constructed such that the speed of the engine is set by permanent adjustment so that the truck will not exceed the set speed during all periods of operation. While this type of governing device is desirable with a truck, it is usually not desired to have a set governed speed for an automobile, thus the governing devices associated with automobiles are generally adjustable to set any desired governed speed.

Because it is desirable to have an adjustable governing system for an automobile, the governing devices in the past have proven inconvenient to operate, particularly when a number of people are apt to drive the automobile and it is desired to have a governed speed for some of the drivers and a non-governed speed for others. In a situation such as this, the inconvenience of having to set and reset the governing apparatus before and after periods of operation of the automobile usually overbalances the benefits of the apparatus so that the governing device is usually unused.

The present invention is directed to a governing apparatus which is automatically changed from governed to non-governed operation without manual setting or adjustments.

According to the invention the governing devices consist of a conventional ignition circuit in which a source of power, the ignition lock, a coil, and condenser are connected in series. In addition, a second circuit is set up in which a governing mechanism is connected to the source of power through the ignition lock.

The ignition lock, which is connected in both circuits, is operable by a pair of keys. One of the keys is operable in the lock to close the ignition circuit and operates the vehicle in a normal manner. The other key when engaged in the ignition lock closes both circuits to energize the governing mechanism. With this construction the owner using the first of the keys is able to operate the car normally without the governing effect. A second person, such as an employee or a teen-ager, using the second key in the ignition lock sets the governing mechanism into operation which limits the speed of the vehicle to the predetermined setting.

With the present invention, no adjustments are required in setting the governing device into effect, for the governed operation is automatically set into effect by use of the second key in the ignition lock. The governing apparatus is of simple construction which can be conveniently installed in any type of vehicle.

The drawings illustrate the best mode contemplated of carrying out the present invention.

In the drawings:

Figure 1 is a diagrammatic showing of the ignition system of a vehicle embodying the present invention;

Fig. 2 is an enlarged side elevation of the governing mechanism of the present invention;

Fig. 3 is an end view of the structure shown in Fig. 2;

Fig. 4 is a vertical section of the ignition lock showing the key to be turnable only in one direction;

Fig. 5 is a section taken along lines 5—5 of Fig. 4;

Fig. 6 is a section taken along lines 6—6 of Fig. 4;

Fig. 7 is a view similar to Fig. 4 showing the second key inserted within the lock;

Fig. 8 is a plan view of the backing plate;

Fig. 9 is a plan view of the contact plate;

Fig. 10 is a view showing the contact plate superimposed on the backing plate and with the ignition lock in the off position;

Fig. 11 is a view similar to Fig. 10 in which the first key is engaged within the lock to energize the ignition circuit; and Fig. 12 is a view similar to Fig. 10 in which the second key is engaged within the lock to energize both the ignition and the governing circuits.

The drawings illustrate an apparatus for governing the speed of a vehicle and includes a conventional ignition circuit in which a source of power 1, such as a battery, has one of its terminals connected to ground and the other of its terminals connected in series in an ignition lock 2, a coil 3 and a condenser 4. The condenser 4 is connected to ground to complete the circuit.

The lock 2 is of conventional construction and comprises a generally cylindrical housing 5 which houses a barrel 6. The barrel is rotatable within the housing 5 and is provided with a central slot 7 to receive a key 8 which is adapted to rotate the barrel within the housing.

To limit the amount of rotation of barrel 6 within housing 5, the inner surface of the housing is provided with a groove 9 and a set screw 10 is threaded within a suitable opening in barrel 6 and is adapted to move within the groove 9. Engagement of the set screw 10 with the ends of the groove 9 limits the rotation of barrel 6 within the housing 5.

The barrel 6 is locked against rotation within the housing 5 by a series of pins 11 which are disposed within suitable openings in the barrel 6. The lower ends of pins 11 are generally tapered and are adapted to extend within slot 7 and engage the lands and grooves in the upper edge of a key 8 when the key is disposed within the slot 7. Each of the pins 11 supports an upper pin 12 which rests on the upper end of pin 11 and is slidable within a recess 13 formed in the housing 5. The pins 12 and 13 are biased downwardly toward the slot 7 by a spring 14 which is disposed in the upper end of each of the recesses 13.

When the key 8 is inserted within the slot 7, the lower ends of the pins 11 engage the upper surface of the key and are positioned vertically by the grooves in the key. If the key is proper, the joint between pins 11 and 12 will coincide with the joint between barrel 6 and housing 5 and the key can be turned to rotate the barrel within the housing. This is shown in Fig. 7. However, if the key is not proper, the joint between pins 11 and 12 will not coincide with the joint between the barrel 6 and housing 5 so that the pin 11 will serve as a stop and prevent the barrel from being rotated.

The inner end of barrel 6 carries a fiber disc 15 which supports a contact plate 16. The disc 15 and contact 16 thereby rotate with the barrel 6. The contact plate 16 is disposed in contiguous relation with a backing plate 17 which is secured within a recess in the outer end of housing 5 by means of a set screw 18.

The contact plate 16 is made of an electrically conductive metal, such as copper, and is provided with a series of circularly spaced nibs 19, 20 and 21.

The backing plate 17 is composed of an insulating material and is provided with cup-shaped recesses 22 which are adapted to receive the nibs 19, 20 and 21 on the contact plate. In addition to recesses 22, the backing plate is provided with a series of contacts 23, 24 and 25. The contact 23 is connected in circuit with the battery 1 or other source of power, the contact 24 is connected to the coil 3, and the contact 25 is connected to the speed governing mechanism, to be described hereinafter.

As shown in Fig. 10, when the key is in the "off" position and the slot 7 is disposed in a vertical plane, the contacts 19, 20 and 21 register with the recesses 22 so that the ignition circuit is open. When the key is rotated to the left, as shown in Fig. 11, contacts 19 and 21 are brought into registry with contacts 24 and 23, respectively, to close the circuit and permit current to flow from the battery 1 through the contact 23, contact 16, contact 24, to the coil 3 and condenser 4.

When the key 8 is rotated to the right, as shown in Fig. 12, contacts 19, 20 and 21 are brought into registry with contacts 25, 23 and 24, respectively. This closes the ignition circuit and also permits current to flow from the battery 1 through contact plate 16 and contact 25 to the governing mechanism.

Thus with the present construction, if the key 8 is rotated to the right, or clockwise, the ignition circuit and the governing circuit are closed while if key 8 is turned to the left, or counter-clockwise, only the ignition circuit is closed.

While the key 8 can be employed to turn the barrel 6 either right or left and selectively effect either a governed or normal operation of the speed of the vehicle, a second key is employed which is adapted to turn the barrel 6 to the left and thereby effect only a governed operation. This is accomplished by providing the inner surface of the housing 5 with a groove 26 which communicates with the innermost of the recesses 13. This groove 26 permits the barrel 6 to be rotated to the left even though the joint between pins 11 and 12 of the innermost of the series of pins is not in registry with the joint between housing 5 and barrel 6. This is shown in Fig. 4 in which a second key 27 is disposed within the barrel 6 and the joint between the innermost pins 11 and 12 is located upwardly of the joint between barrel 6 and housing 5. In this position, the key 27 cannot be rotated to the right due to the fact that the innermost pin 11 forms a stop which engages the wall of the recess 13. However, the key 27 can be rotated to the left due to the fact that the innermost pin 11 will move within the groove 26 and is not obstructed.

The key 8 can be rotated in either direction within the housing 5 to thereby close the ignition circuit only if rotated to the left and to close both the ignition circuit and the circuit connected to the governing mechanism if rotated to the right. In contrast to this, the key 27 can only be rotated to the left and this closes the ignition circuit and does not affect the circuit to the governing apparatus.

As shown in Fig. 1, the speed of the vehicle is controlled by a foot pedal 28 which is connected through a rod 29 to the butterfly valve 30 in the manifold of the vehicle.

The governing mechanism includes a casing 31 having aligned openings to receive the rod 29. A solenoid 32 is suitably supported within the casing 31 and the armature 33 of the solenoid is adapted to engage and hold the upper leg of a generally L-shaped bracket 34 which is pivotally attached to lugs 35. The lugs 35 are secured to the solenoid. The lower end of bracket 34 is bent as indicated by 36 and straddles the rod 29 in the normal position when the solenoid is not energized. The bent end 36 is adapted to provide an abutment which is engaged by a generally U-shaped block 37 that is removably secured by set screw 38 to the rod 29.

As the foot pedal 28 is depressed to move rod 29 forwardly, the block 37 will strike the abutment 36 of bracket 34 and limit the movement of the rod. This in effect, provides a governing of the speed of the vehicle for the rod 29 cannot be moved beyond the abutment 36 to increase the amount of gas to the engine.

The solenoid is connected in series with contact 25 of backing plate 17 and is grounded. Thus when key 8 is turned to the right, clockwise, the solenoid is energized and the bracket 34 is pivoted counter-clockwise and the abutment 36 is pivoted upwardly out of the path of the block 37. With the abutment 36 out of the path of the block, the rod 29 is free to move without obstruction and the governing system is not in effect.

In operation, the abutment 36 is normally in the down position in location to be engaged by the block 37 and thereby govern the speed of the vehicle. The owner or other person operating the car who is not to have the governed speed in effect uses key 8 in the ignition lock 2. The key 8 when turned to the right will close both the ignition circuit and the circuit to the solenoid 32, thereby energizing the solenoid and pivoting the abutment 36 upwardly out of the path of the block 37. The vehicle can then be operated in the normal manner without any governing effect on the speed.

If the key 8 is turned to the left only the ignition circuit is closed and the abutment 36 will remain in the path of the block 37 to govern the speed of the vehicle.

The second key 27, which is adapted to be used by an employee or teen-ager or any other person who the owner desires to drive with a governed speed, cannot be turned to the right but only to the left. Thus when key 27 is turned to the left, only the ignition circuit is closed and the abutment 36 remains in the downward position to govern the speed of the vehicle.

The present invention provides a simple and convenient way of automatically governing the speed of a vehicle without manual setting or adjustments. By using the first key 8, the vehicle can be operated in the normal manner without a governing system being in effect, while use of the key 27 puts the governing system into effect and restricts the speed of the vehicle to a predetermined value.

By adjusting the position of block 37 on rod 29 the governed speed can be changed. That is, the position of block 37 can be moved along the rod 29 to permit the maximum speed of the vehicle to be varied as desired. The casing 31 can be sealed in any convenient manner to prevent tampering or changing of the maximum governed speed as set by the owner.

While the above description is directed to the abutment 36 being normally in the down position to govern the speed of the vehicle it is contemplated that the abutment may be normally up and the solenoid de-energized by the use of key 27 to lower the abutment into the path of block 37.

It is also contemplated that a pair of ignition locks 2 may be employed instead of the single lock described above. In this case the key 8 would be engageable with one of the locks and the key 27 with the other. Under these circumstances the key 8 would function to close the ignition circuit in a conventional manner, and the key 27 in the second lock would operate to close both the ignition circuit and the circuit to the solenoid.

Various modes of carrying out the invention are contemplated as within the scope of the following claims particularly pointing out and distinctly claiming the subject matter which is regarded as the invention.

I claim:

1. A speed governing apparatus for a prime mover having an ignition circuit connecting the primer mover to a source of electrical energy, comprising ignition switch means connected in said ignition circuit and having two operable positions, speed governing means for governing the speed of said prime mover, and a second circuit connecting said governing means and said ignition switch means to said source of electrical energy, said switch means being operable in the first of said positions to close said ignition circuit and being operable in the second of said positions to close both said ignition and second circuits.

2. The apparatus of claim 1 in which the ignition switch means includes a key actuated lock and a pair of keys, one of the keys being operable in the lock to close said ignition circuit and the second of the keys being operable in the lock to close both the ignition and second circuits.

3. A speed governing apparatus for a prime mover having an ignition circuit connecting the prime mover to a source of electrical power, comprising an ignition switch lock connected in said ignition circuit and having two operable positions, speed governing means for governing the speed of said prime mover, a second circuit connecting said governing means and said ignition switch means to said source of power, a first key engageable with said lock for moving said ignition switch lock to the first of said operable positions to close said ignition circuit, and a second key engageable with said lock for moving said ignition switch lock to the second of said operable positions to close both the ignition circuit and said second circuit.

4. An apparatus for use with a prime mover having an ignition circuit connecting the prime mover to a source of electrical power, comprising throttle means to control the speed of said prime mover, speed governing means associated with said throttle means to govern the speed of said prime mover, key actuated ignition switch means connected in the ignition circuit, connecting means interconnecting said ignition switch means and said speed governing means, a key engageable with said ignition switch means for actuating the same and closing the ignition circuit and starting said prime mover, and a second key separately engageable with said ignition switch means for closing the ignition circuit and starting said prime mover and simultaneously actuating said speed governing means through said connecting means.

5. An apparatus for use with a primer mover having an ignition circuit connecting the prime mover to a source of electrical power, comprising throttle means to control the speed of said prime mover and including a throttle rod adapted to be moved reciprocally in accordance with demands for increased or decreased speed, a stop member adjustably secured to the throttle rod, and abutment disposed in a position to be contacted by said stop member as said throttle rod moves in a given direction, electromagnetic means connected to the abutment and adapted to withdraw said abutment from said position, key actuated ignition switch means connected in the ignition circuit, a key engageable with said ignition switch means for actuating the same and closing the ignition circuit and starting said prime mover, a second key separately engageable with said ignition switch means for closing the ignition circuit and starting said prime mover, and means actuated by said second key when in engagement with said ignition means for energizing said electro-magnetic means and withdrawing said abutment to thereby permit said throttle rod to move without obstruction.

6. An apparatus for use with a prime mover, comprising throttle means to control the speed of said prime mover, speed governing means associated with said throttle means to govern the speed of said prime mover, ignition means connecting said prime mover to a source of electrical energy for starting said prime mover and actuated by a key, and second ignition means connecting said governing means with the prime mover and said source of energy for starting said prime mover and effecting operation of said governing means, said second ignition means being actuated by a second key separate from the first key.

7. An apparatus for use with a prime mover, comprising throttle means to control the speed of said prime mover and including a throttle rod adapted to be moved reciprocally in accordance with demands for increased speed, a stop member adjustably secured to the throttle rod, and abutment disposed in a position to be contacted by said stop member as said throttle rod moves in a given direction, a solenoid having an armature connected to the abutment and adapted to withdraw the abutment from said position when energized, key actuated ignition switch means, an electric circuit connecting said prime mover and said ignition switch means to a source of electrical energy, a second electrical circuit connecting said prime mover and said ignition switch means and said solenoid to said source of electrical energy, a key engageable with said ignition switch means for closing said first circuit and starting said prime mover, and a second key separate from said first key and engageable with said ignition switch means for closing said second circuit and starting the prime mover and energizing said solenoid to thereby withdraw said abutment.

8. A speed governing apparatus for a prime mover having an ignition circuit connecting the prime mover to a source of electrical energy, comprising ignition switch means connected in said ignition circuit and having two operable positions, speed governing means for governing the speed of said prime mover, a second circuit connecting said governing means and said ignition switch means to said source of electrical energy, and means to selectively move said ignition switch means to each of said two operable positions with said switch means being operable in the ignition of said positions to close said ignition circuit and being operable in the second of said positions to close both said first and second circuits.

References Cited in the file of this patent
UNITED STATES PATENTS

| | | |
|---|---|---|
| 919,588 | Jones | Apr. 27, 1909 |
| 2,171,401 | McCoy | Aug. 29, 1939 |
| 2,667,785 | Opocensky | Feb. 2, 1954 |